United States Patent [19]

Willens

[11] Patent Number: 4,772,866
[45] Date of Patent: Sep. 20, 1988

[54] DEVICE INCLUDING A TEMPERATURE SENSOR

[76] Inventor: Ronald H. Willens, 7 Wychwood Way, Warren, N.J. 07060

[21] Appl. No.: 850,979

[22] Filed: Apr. 11, 1986

[51] Int. Cl.$^4$ .............................................. H01C 7/10
[52] U.S. Cl. ................................. 338/225 D; 338/22 R
[58] Field of Search .................. 338/225 D, 22 R, 25, 338/28; 219/494, 501, 505; 357/28, 71, 74, 81, 82; 374/147, 178; 427/126.3, 126.5, 126.6, 376.2

[56] References Cited

U.S. PATENT DOCUMENTS 4,424,507 1/1984 Nagai et al. ..................... 338/22 R
4,463,337 7/1984 Håkanson ......................... 338/22 R Primary Examiner—E. A. Goldberg
Assistant Examiner—M. M. Lateef
Attorney, Agent, or Firm—Peter A. Businger

[57] ABSTRACT

A structure of alternating layers of titanium and an insulator or semiconductor material has temperature-sensitive electrical resistivity. In combination with a resistance-measuring circuit, such structure can serve as an accurate temperature sensor. And, since electrical resistivity is inversely related to temperature, disclosed structures can serve as miniature thermistors in integrated circuit devices.

13 Claims, 1 Drawing Sheet

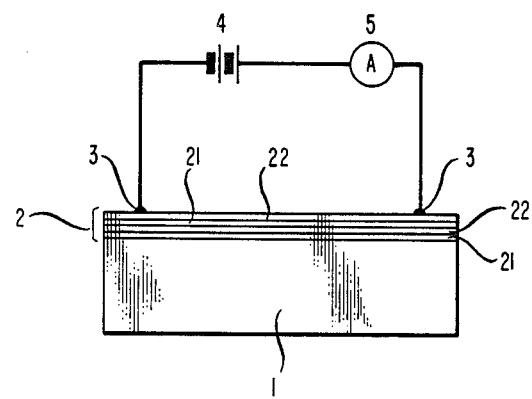

4,772,866

DEVICE INCLUDING A TEMPERATURE SENSOR

TECHNICAL FIELD

The invention is concerned with devices including a temperature sensor and, more specifically, with devices including a thermo-electric sensor.

BACKGROUND OF THE INVENTION

A considerable number of physical effects are known which allow determination of temperature of an object of interest, and it has been found convenient to broadly classify temperature sensing methods and devices depending on whether a sensor element is in physical contact with an object or else is separated from the object of interest.

These broad classes of contact and non-contact methods, in turn, have been subdivided further; in particular, with respect to contact methods, subdivisions include methods based on the thermal expansion of gases, liquids, or solids, on the variation of electrical resistance of substances as a function of temperature, and on thermoelectric effects. In the following, particular attention is paid to methods based on the variability of electrical resistivity as a function of temperature.

Popular among devices based on such variability are thermometers in which a variable-resistance conductor element is made of nickel or platinum; determination of the electrical resistance of a such element can be carried out on the basis of Ohm's law and may involve the use of a Wheatstone bridge.

SUMMARY OF THE INVENTION

It has been discovered that structures of alternating layers of titanium and an insulator or semiconductor material have temperature-dependent electrical resistivity. The relationship between temperature and resistivity was found to be essentially linear over an extended range of temperatures, and temperature response is rapid. Accordingly, when combined with means for determining resistivity, such structures can serve as inexpensive, accurate, sensitive temperature sensors. Furthermore, such structures are readily incorporated in devices such as, e.g., semiconductor integrated devices.

BRIEF DESCRIPTION OF THE DRAWING

The FIGURE schematically shows a temperature sensor device in accordance with the invention.

DETAILED DESCRIPTION

Shown in the FIGURE are substrate 1, structure 2 of alternating layers of titanium 21 and a semiconductor or insulator material 22, electrical contacts 3, constant voltage source 4, and ammeter 5 whose readout depends on the resistance of structure 2 and thus, in accordance with the invention, on the temperature of structure 2.

The material of the substrate may be semiconducting or insulating, a body of silica glass or a silicon chip being suitable, for example. Titanium layers may be in amorphous or polycrystalline form, and such layers preferably consist of at least 99 weight percent titanium, iron and nickel being among potential and common remainder elements. In the context of the invention, semiconductor and insulator materials together are characterized by electrical resistivity greater than 10,000 micro-ohm-cm; as to such layer materials, doped or undoped silicon is a convenient choice, and germanium may also be used. Also, mixtures and semiconductor compounds are contemplated. Doping may be n- or p-type. Moreover, the use of diverse semiconductor or insulator layers, alternating with titanium in one and the same structure, is not precluded. Individual layer thickness preferably is in a range of from 0.1 to 10 nanometers, such limits being justified mainly on the basis of convenience and economy of deposition. The number of periods of alternating layers may be chosen conveniently in the range from 1 to 1000.

As illustrated by the following examples, temperature response of specific devices is such that electrical resistance of a layered structure is inversely related to temperature. Accordingly, devices of the invention can serve as thermistors, e.g., in the field of integrated circuitry.

EXAMPLE 1

Alternating layers of titanium and silicon were deposited by electron-beam evaporation on a p-type, 50-ohm-cm silicon substrate having an impurity concentration of approximately $2 \times 10^{14}/cm^3$. During deposition the substrate temperature was approximately 5 degrees C., and deposition was in a vacuum in which the residual atmosphere consisted primarily of hydrogen at a partial pressure of less than $10^{-8}$ torr (approximately $133 \times 10^{-8}$ Pa). Deposition rate was approximately 0.1 nanometer/sec. Individual layers of titanium and silicon had approximate respective thicknesses of 0.6 nanometer and 1.4 nanometer, and a structure having 300 periods of alternating titanium and silicon layers was deposited.

A four-probe method was used for resistance measurement, and a total resistance of approximately 37 ohms was found at room temperature. Based on a total film thickness of approximately 600 nanometers, room-temperature resistivity was calculated as approximately 790 micro-ohm-centimeter. In the temperature domain from 10 to 300 degrees K., resistivity was found to vary highly linearly by approximately $-0.5$ micro-ohm-cm/K.

EXAMPLE 2

A structure of 10 periods of alternating layers of titanium and silicon was made by electron-beam evaporation as described above in Example 1. Individual layers had a thickness of approximately 0.6 nanometer for titanium and approximately 1.3 nanometer for silicon. Based on a total film thickness of approximately 19 nanometers, the resistivity of the film was determined as approximately 240 micro-ohm-cm at room temperature. In the temperature domain from 10 to 50 degrees C., resistivity was found to vary approximately linearly by approximately $-3.3$ micro-ohm-cm/K.

EXAMPLE 3

A structure of 20 periods of alternating layers of titanium and silicon was made by electron-beam evaporation onto a silica glass substrate. Individual layers had a thickness of approximately 0.6 nanometer for titanium and approximately 1.3 nanometer for silicon. Response was found to be essentially linear in a temperature domain from 10 to 130 degrees C.

What is claimed is:

1. Device comprising a temperature sensor element and a first and a second contact to said temperature sensor element, said device being characterized in that
said temperature sensor element consists essentially of a substrate-supported layered structure of alternating first and second layers,
the material of said first layers consisting essentially of titanium, and
the material of said second layers having electrical resistivity greater than 10,000 micro-ohm-cm.

2. Device of claim 1 in which titanium is included in the material of said first layers in an amount which is greater than or equal to 99 percent.

3. Device of claim 1 in which the material of said second layers is essentially the same in said substrate-supported layered structure.

4. Device of claim 1 in which the material of said second layers consists essentially of silicon.

5. Device of claim 1 in which the material of said second layers consists essentially of germanium.

6. Device of claim 1 in which the material of said second layers consists essentially of a mixture of silicon and germanium.

7. Device of claim 1 in which said structure is supported by a body of insulator material.

8. Device of claim 7 in which said body consists essentially of silica glass.

9. Device of claim 1 in which said structure is supported by a body of semiconductor material.

10. Device of claim 9 in which said body consists essentially of silicon.

11. Device of claim 1 in which the thickness of said first and second layers is in the range from 0.1 to 10 nanometers.

12. Device of claim 1 in which said device is an integrated semiconductor device.

13. Device of claim 1 in which said temperature sensor element serves as a thermistor.

* * * * *